United States Patent
Schramm

(10) Patent No.: US 7,266,500 B2
(45) Date of Patent: Sep. 4, 2007

(54) METHOD AND SYSTEM FOR AUTOMATIC ACTION CONTROL DURING SPEECH DELIVERIES

(75) Inventor: Hauke Schramm, Roetgen-Mulartshuette (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 10/011,897

(22) Filed: Dec. 3, 2001

(65) Prior Publication Data

US 2002/0082843 A1 Jun. 27, 2002

(30) Foreign Application Priority Data

Dec. 6, 2000 (DE) .................................. 100 60 587

(51) Int. Cl.
*G10L 21/00* (2006.01)
*G10L 15/00* (2006.01)
(52) U.S. Cl. ........................................ 704/275; 704/251
(58) Field of Classification Search ................ 704/270, 704/275, 251, 231
See application file for complete search history.

(56) References Cited

U.S. PATENT DOCUMENTS

| | | | |
|---|---|---|---|
| 5,386,227 A * | 1/1995 | Zeper | 348/61 |
| 5,649,060 A * | 7/1997 | Ellozy et al. | 704/278 |
| 6,272,461 B1 * | 8/2001 | Meredith et al. | 704/235 |
| 6,279,018 B1 * | 8/2001 | Kudrolli et al. | 715/540 |
| 6,324,514 B2 * | 11/2001 | Matulich et al. | 704/275 |
| 6,452,612 B1 * | 9/2002 | Holtz et al. | 715/723 |
| 6,601,055 B1 * | 7/2003 | Roberts | 706/45 |
| 6,931,587 B1 * | 8/2005 | Krause | 715/500 |
| 2002/0072896 A1 * | 6/2002 | Roberge et al. | 704/10 |

FOREIGN PATENT DOCUMENTS

| | | |
|---|---|---|
| DE | 3839361 A1 | 5/1990 |
| DE | 19808585 A | 9/1999 |
| EP | 0896467 A1 | 2/1999 |
| WO | WO0054496 | 9/2000 |

* cited by examiner

*Primary Examiner*—David Hudspeth
*Assistant Examiner*—Matthew J. Sked

(57) ABSTRACT

A system and method of automatically controlling actions in dependence on a text of a speech includes storing most words or word combinations of the speech text. During the delivery of the speech, the speech text is captured by an acoustic recording device and applied to a speech recognizer. With the aid of the speech recognizer the captured text of the speech is compared with the stored words or word combinations. If one of the stored words or word combinations of the text of the speech is recognized, a defined action can be triggered automatically.

19 Claims, 1 Drawing Sheet

METHOD AND SYSTEM FOR AUTOMATIC ACTION CONTROL DURING SPEECH DELIVERIES

Figure 1:
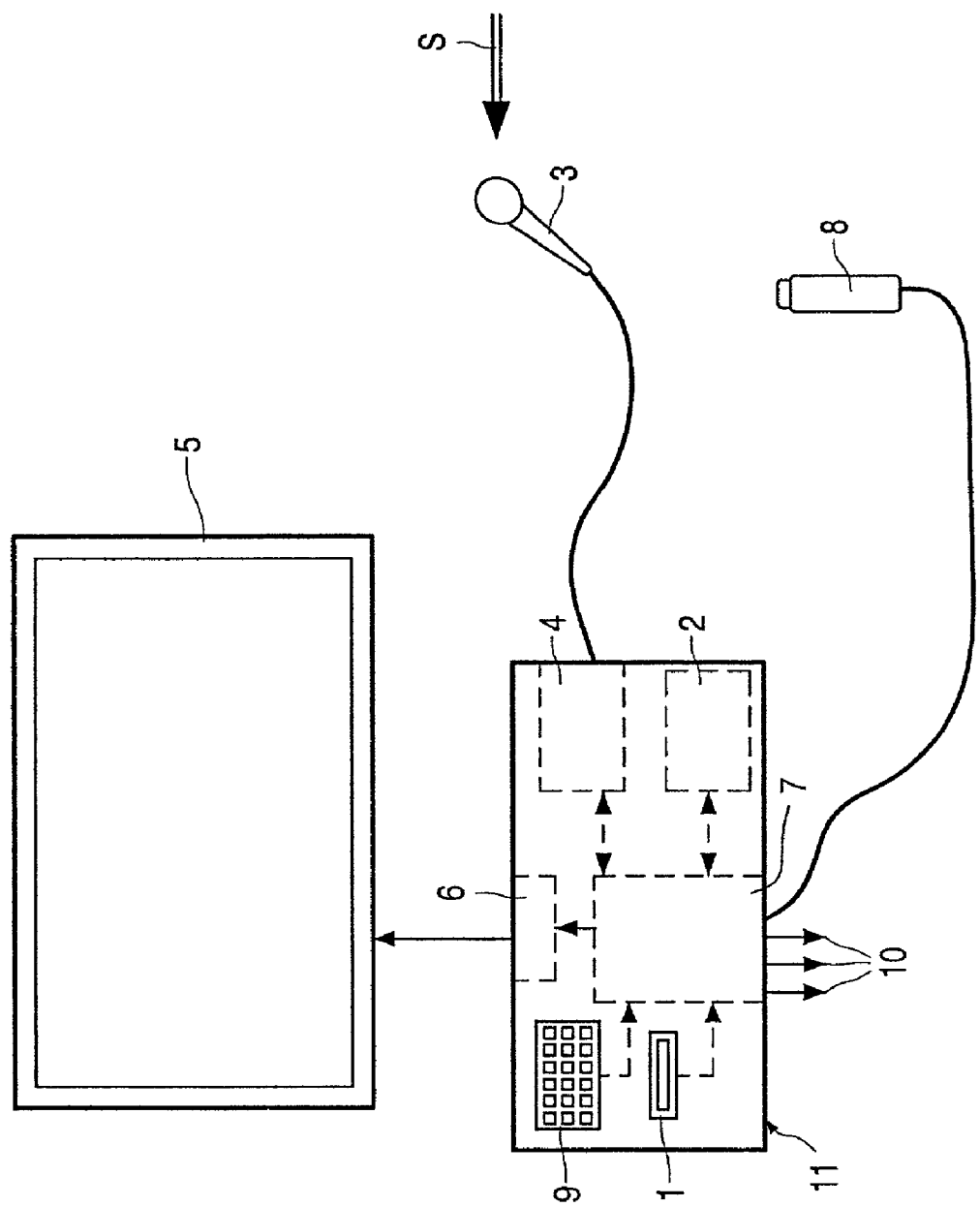

The invention relates to a method and a system for automatically controlling actions in dependence on a text of a speech.

Speakers of prepared texts, such as, for example, news readers or politicians, often read their texts directly from paper. This is relatively circumstantial and involves the risk of losing the connection of the speech on the next page after turning the page. This is furthermore disadvantageous in that the speaker time and again has to look away from the public to read on. Similarly holds for speakers who have made a list of cues and hold their address with the aid of this cue list and therefore occasionally have to look at the paper stating this cue list. In many other areas, in which a prepared text is spoken or sung in the framework of a performance, the performers have to learn their text by heart. Although the respective actors have been trained to learn texts, it often happens that there are undesired brief gaps.

To remedy this, there is a possibility to show the text to a respective actor on a monitor installed close to the direction in which the actor looks into the public. For the text to be displayed large enough and readable enough, the displayed information is always limited to a relatively restricted section within the whole text. While the text continues, the section shown is to be updated regularly i.e. the test is continuously or rhythmically scrolled on the monitor. As a rule, this is done at a fixed speed to which the respective actor is to adjust. In case an individual advance is desired, an additional person is to operate the display or the speaker is to be given the opportunity to advance the respectively displayed text himself via switches or push-buttons, which, as the case may be, may lead to an actor being distracted and the public noticing this.

The same problem occurs if during a speech or song other actions are to take place at certain instants, for example, certain lighting is to be stopped, the room is to be darkened, a film is to be recorded, a "foil is to be changed" or a picture is to be changed or faded-in during a computer-aided presentation, etc. Here too, the actor himself is to take over these tasks or additional staff is needed who either exactly know the whole speech to be delivered or receives indications from the speaker which, in its turn, may be disturbing while the speech is being delivered.

It is an object of the present invention to provide an alternative to this state of the art.

According to the invention first i.e. previous to the speeches, most of the words or word combinations of the speech text are stored. Furthermore, when the speech is being delivered, the text to be spoken is captured by an acoustic recording device, for example, a microphone and applied to a speech recognizer. With the aid of this speech recognizer the captured text of the speech is compared with the stored words or word combinations. When at least several of the stored words or word combinations of the speech text are recognized, defined, for example, predetermined actions are then triggered automatically. These actions may be, on the one hand, the scrolling of a section-wise display of the speech text for the speaker and, on the other hand, actions such as lighting, darkening etc.

The stored words may be, for example, both the whole text of the speech and a list of cues which are sequentially dealt with in the text to be delivered. This means, the method and system according to the invention are also suitable for ad-libbing speakers who work only with a list of cues. The word combinations may then be, for example, sentences or fragments of sentences. They may also be, for example, single cues which indicate a certain sentence cohesion and which will then show up in a certain sentence during the speech at a predefined position. For example, the connotations "turnover", "profits", "1999" and "2000" could be used for different combinations with respectively different actions being executed when a certain combination of these words occurs. In this manner, for example, different graphs can automatically be shown to the public when a combination occurs of "profits" and "2000", "profits", "1999" and "turnover" and "2000".

A system for implementing such a method first needs means for inputting most of the words or word combinations of the text of the speech. They may be, for example, an interface for transmitting the finished speech from a PC, a data carrier reader such as a floppy disk drive, or a keyboard etc. Furthermore, a memory is necessary for the system in which memory the words or word combinations, respectively, of the text of the speech are stored. When a data carrier reader is used, also the inserted data carrier can be used as a memory.

Furthermore, an acoustic recording device, for example, a microphone is necessary for capturing the speech text during a speech. The system furthermore needs means for comparing the captured text of the speech with the stored words or word combinations, while these means comprise a speech recognition system. The speech recognition system itself can already make a comparison inasmuch as, for example, the speech recognition system has available as permissible words in a library only the stored words or word combinations of the text of the speech as "candidates" as permissible words. However, this may also be a conventional speech recognizer with an extensive library, where this speech recognition is then followed by a separate comparator which compares the words recognized by the speech recognizer with the stored words and word combinations or words of the full stored text, respectively.

In the last instance the system needs means for executing certain actions when the stored words or word combinations of the text of the speech are recognized. These means may be, for example, an optical output arrangement such as a monitor or a projector which comprises a respective controller for showing a section of the speech text around the recognized word.

In a particularly advantageous example of embodiment are then stored in the memory at least complete sections of the text of the speech (the whole text of the speech, respectively). When some of the stored words or word combinations are recognized, this display is updated each time. This means that always the current text section is automatically scrolled on the monitor without additional staff and without the speaker's special active intervention.

As an alternative or addition to these personal means for carrying out the actions, the system may also have an interface via which control commands for carrying out certain actions are transferred to other devices, for example, a control output for a slide or film projector or for switching the lighting on and off. It is likewise possible for this also to be a wireless interface which is connected to a PC on which a presentation program is running during the speech, with which via a suitable display arrangement "foils" are introduced to the public.

Preferably, a word order or word combination order occurring in the speech text is also stored. When one of the stored words or word combinations of the speech text is recognized, a check is made whether the recognized word or the word combination can occur after a previously stored word or word combination of the speech text while this stored order is taken into consideration. This means, an additional check is made whether these words can actually be each other's successor in the sequence. Only in that case will the defined action be triggered. To avoid the whole system being turned off as a result of words that may not have been recognized correctly, not only the immediately succeeding or preceding word is to be taken into consideration, but also further succeeding or preceding words are to be taken into consideration. This means that at times also certain words are skipped.

In a preferred example of embodiment the system further comprises a suitable actuation device, for example, a button or a switch for setting the size of the currently displayed text section around the recognized word. This actuation device preferably comprises a simple button for the speaker, which button is connected so that with each depression of the button a larger section of the text of the speech around the recognized word or word combination is shown. Such a "panic button", which causes a larger section to be shown of the last part of correctly recognized speech is a help for finding back the connection after recognition errors or slips of the tongue. Switching back to a smaller section with larger letters may then be effected once a certain word order has been recognized again by the speech recognition system. It is also possible to switch back after a certain period of time or via a further actuation device.

It is also advantageous to have a simple actuation device for temporarily deactivating and/or activating the system. By means of such a pause push-button there may be provided that the actor spontaneously incorporates in his speech parts that have not been stored before and the whole system pauses during this time and thus does not erroneously lead to actions.

The invention will be further explained in the following while reference is made to the appended FIGURE. The sole FIGURE diagrammatically shows the structure of a system according to the invention comprising the components essential to the invention.

In the example of embodiment shown in the FIGURE, the system first includes an apparatus 11 to which a microphone 3 and a monitor 5 are connected.

This apparatus 11 includes a floppy disk drive 1 as well as a keyboard 9. In addition, this apparatus 11 has a display screen controller 6, a speech recognition unit 4, a memory 2 and a central processing unit 7. All further components communicate with this central processing unit 7 and thus also among themselves via this processing unit 7. The microphone 3 is in the present example of embodiment directly connected to the speech recognition device 4 through a respective input (not shown).

To implement the method according to the invention, the whole speech text is stored on a floppy disk prior to the delivery of the speech and is stored in the memory 2 via the floppy disk drive 1 and the processing unit 7. Additional parameters, such as, the language used, can be fed as information to the speech recognition system 4 via the keyboard 9. Furthermore, the additional control commands can be defined by this keyboard 9, for example, with which words which special actions are to be carried out. Alternatively, this information may also be stored together with the text in a certain format on the floppy disk.

The acoustic speech signals S delivered by the actor are captured by the microphone during the delivery and transferred to the speech recognition unit 4. This speech recognition unit 4 is set by the processing unit 7 so that only the speech text stored in the memory 2 or the words and word combinations stored there are searched for and only corresponding connotations are recognized. A speech recognition reduced to such a limited context usually works faster and more reliably than a speech recognition having a very much larger context and thus a larger word and sentence potential to be recognized.

The stored text is displayed section by section on the monitor 5 via the processing unit 7 and the picture screen controller 6, while each time a text section is represented around the respective word recognized last. The recognized word or word combination, respectively, is marked in color or in italics when the text section is displayed, so that the speaker always sees where he is in the text. When certain words are recognized, the cursor on the monitor 5 is updated automatically, i.e. it is switched on so that always a text section around the actor's word spoken last is shown. Certain words may then be used as keywords i.e. only with these special words will the display be switched over. These words may, on the one hand, the predetermined. But, on the other hand, they may also be defined by the position in the currently shown text section. For example, it may always be the first or second word of the last line of the text section shown a minute earlier when the display is updated.

With another setting, each stored word is such a control word, i.e. the section is advanced by one word each time a single word is recognized, for example. When a complete speech text is stored, the text is scrolling continuously while the speed is defined by the speaker himself via his speech. This means that there is no need for the speaker to adjust to the display with his speech rate, but the display is adjusted to the speed of the current speaker.

Furthermore, a "panic button" is connected to the processing unit 7. When after a possible recognition error or slip of the tongue the actor cannot readily find back the connection, he can provide by pressing this panic button that a larger section of the most recently recognized speech text is displayed on the monitor 5, so that it is made easier for the actor to resume his speech.

The processing unit 7 furthermore has a plurality of control outputs 10. Any other devices, for example, a slide projector or film projector, a darkening arrangement etc, can be connected to these control outputs 10. The control outputs 10 then supply respective predefined control instructions to the connected apparatus as soon as one of these apparatus is to carry out a certain action. These control instructions are given when keywords previously defined by the speech recognition system 4 can be recognized during the speech.

The apparatus 11 is shown here as a compact apparatus which comprises various individual components in a casing. As an alternative, the system may naturally also comprise various such individual components in separate casings which are intercoupled accordingly. It is also possible to realize several of the represented components, for example, the speech recognition system 4 in the form of software on a suitable computer. The apparatus 11 itself is then, for example, the computer. The processing unit 7 is then accordingly formed by the CPU, for example, and the speech recognition unit 4 is realized inside this CPU or in a separate parallel processor in the form of software. The picture screen control unit 6 may then be, for example, a conventional graphics card with respective driver software for the monitor 5. Such a computer usually includes a keyboard or a connection for this respectively, a floppy disk drive, a suitable memory and respective serial and parallel control outputs and inputs for connecting an actuation device, for example, a mouse. These inputs can be used for connecting a "panic button".

As a result of the invention, a new speech recognition-based aid is rendered available which facilitates the work of performers of any type such as speakers, news readers, singers, anchor men, actors etc. Since it may be assumed that there are usually good acoustic conditions (such as, for example, close talk microphones specially created for speakers) at such events, that the speakers are often linguistically trained and that in addition the text to be recognized (or the words or word combinations, respectively) is already known beforehand, it is guaranteed that the speech recognition system necessary for the invention can work in a robust and fast manner.

The invention claimed is:

1. A method of automatically controlling actions in dependence on a text of a speech in which most of the words or word combinations of the text of the speech are stored, and the text of the speech is captured during delivery by an acoustic recording device and applied to a speech recognizer, and with the aid of a speech recognizer the captured text is compared with the stored words or word combinations and further compared to a relation of the captured text with at least one previously recognized stored word or word combination, a defined action is triggered automatically, said speech recognizer being further configured, in performing said comparing with word combinations, to consider combinations that skip certain words in said captured speech when said certain words are not correctly recognized; and
wherein when a push-button or a switch is actuated, a last part of a correctly recognized portion of the speech is displayed in a smaller font size to provide a larger section of the speech.

2. A method as claimed in claim 1, wherein at least whole sections of the text of a speech are stored in the memory.

3. A method as claimed in claim 1 wherein the respective recognized word or word combination is marked when the text section is displayed.

4. A method of automatically controlling actions in dependence on a text of a speech in which most of the words or word combinations of the text of the speech are stored, and the text of the speech is captured during delivery by an acoustic recording device and applied to a speech recognizer, and with the aid of the speech recognizer the captured text is compared with the stored words or word combinations and further compared to a relation of the captured text with a previously recognized stored word or word combination and at least updating a display of the captured text when at least a first word of a last line of said displayed text is recognized, wherein the displayed captured text is advanced by one word each time a single word or word combination is recognized, and wherein when a panic button is pressed, a last part of a correctly recognized portion of the speech is displayed in different size than what was displayed before the panic button was pressed.

5. A system for automatically controlling actions in dependence on a text of a speech comprising:
means for entering at least most of the words or word combinations of the text of a speech, a memory for storing at least most of the words or word combinations of the text of a speech,
an acoustic recording device for capturing text during a delivery of the text of the speech,
means for comparing the captured text with the stored words or word combinations to determine words or word combinations for display on a display device, wherein at least one section of the captured text, which contains a just recognized word or word combination, is displayed and the displayed captured text is advanced by one word or word combination each time a single word is recognized the comparing means comprising:
a speech recognition system comprising;
an input device for designating a plurality of predetermined keywords and an interface for sending control instructions to another device other than said display device when a predefined combination of the plural predetermined keywords and the relation of the keywords with previously recognized keywords is recognized; and
means for displaying a last part of a correctly recognized portion of the speech in a smaller font size in order to display a larger section of the captured text.

6. A system as claimed in claim 5, wherein the memory stores at least two sections of said text of the speech.

7. The system of claim 6, wherein the means for carrying out certain actions comprise a display device for displaying at least a just recognized section of the speech text containing a word or word combination.

8. The system of claim 6, further comprising means for carrying out certain actions when certain stored keyword combinations of the speech text are recognized by said speech recognition system.

9. The system of claim 5, wherein said another device comprises a lighting control.

10. The system of claim 5, further comprising an actuation device for enabling a user delivering said speech to operate the actuation device for adjusting the size of a currently displayed text section during said delivery.

11. The system of claim 10, wherein said size comprises a character length for current display.

12. The system of claim 5, further comprising an actuation device for enabling a deliverer of said speech to temporarily pause the system or reset the pause.

13. The system of claim 12, further comprising means for automatically reverting back after said pause when said speech recognizer recognizes newly spoken words.

14. The system of claim 5, wherein said memory includes substantially less words relative to the speech text in order to increase speed of comparison of said means for comparing.

15. A system for automatically controlling actions in dependence on a text of a speech comprising:
means for entering most of the words or word combinations of text of a speech,
a memory for storing most of the words or word combinations of the text of a speech,
an acoustic recording device for capturing the text of the speech during a delivery of the text of the speech,
means for comparing the captured text with the stored words or word combinations and further comparing a relation of the captured speech text to a previously recognized stored word or word combination of the text of the speech, these means comprising a speech recognition system, and comprising means for updating displayed text when at least a first word of a last line of said displayed text is recognized, wherein at least one section of the speech is displayed by means of an optical display device and the displayed speech is advanced by one word or word combination each time a single word is recognized; and
means for displaying a last part of a correctly recognized portion of the speech in a smaller font size in order to display a larger section of the captured text.

16. A system as claimed in claim 15, further comprising: an actuation device comprising;
- a push-button which is arranged so that with each depression of the push-button a larger section of the speech text around the recognized word or word combination is displayed.

17. A system for automatically controlling actions in dependence on a text of a speech comprising:
- means for entering at least most of the words or word combinations of the text of the speech,
- a memory for storing at least most of the words or word combinations of the text of the speech, an acoustic recording device for capturing text during a delivery of the text of the speech,
- means for comparing the captured text with the stored words or word combinations and further comparing a relation of the captured text to a previously recognized stored word or word combination of the text of the speech to determine words or word combinations for display on a display device, wherein at least one section of the displayed captured text is advanced by one word or word combination each time a single word is recognized, these means comprising a speech recognition system, said system further comprising:
  - an interface for sending control instructions to another device in dependence on a word or word combination recognized by said speech recognition system, said system further including an actuation device configured for enabling a deliverer of said speech to operate the actuation device for to temporarily pause the system and/or reset the pause; and
  - a panic button for displaying a last part of a correctly recognized portion of the speech in a smaller font size in order to display a larger section of the speech.

18. A display device controller communicatively connected with a recognizer of at least one of words and word combinations and a relation of the captured text to a previously recognized stored word or word combination, said recognizer being in communicative connection with an acoustic recording device configured for capturing speech text during delivery of the speech, and with a memory containing a pre-stored text corresponding to said speech text, said controller being configured to scroll so as to maintain on display one or more words preceding, and one or more words following, the word or word combination, respectively, most-recently recognized by the recognizer from said captured speech text, said words following being part of said pre-stored text, said apparatus further comprising a display device on which said controller maintains said display of one or more words preceding or following wherein at least one section of the displayed captured text is advanced by one word or word combination each time a single word is recognized, said apparatus having an interface for sending control instructions to another device other than said display device when a particular keyword combination is recognized by said recognizer; and a panic button for displaying a last part of a correctly recognized portion of the speech in a smaller font size in order to display a larger section of the speech.

19. The apparatus of claim 18, wherein said another device comprises a lighting control.

* * * * *